United States Patent
Shinohara et al.

(10) Patent No.: US 11,947,133 B2
(45) Date of Patent: Apr. 2, 2024

(54) DISPLAY SWITCHING DEVICE

(71) Applicant: OMRON Corporation, Kyoto (JP)

(72) Inventors: Masayuki Shinohara, Kyoto (JP); Yuto Mori, Kyoto (JP); Gouo Kurata, Kyoto (JP); Tsuyoshi Arai, Kyoto (JP); Hayato Yoshida, Kyoto (JP)

(73) Assignee: OMRON Corporation, Kyoto (JP)

( * ) Notice: Subject to any disclaimer, the term of this patent is extended or adjusted under 35 U.S.C. 154(b) by 216 days.

(21) Appl. No.: 17/674,888

(22) Filed: Feb. 18, 2022

(65) Prior Publication Data

US 2022/0291425 A1   Sep. 15, 2022

(30) Foreign Application Priority Data

Mar. 15, 2021   (JP) .................................. 2021-041190

(51) Int. Cl.
  *G02B 3/00*  (2006.01)
  *G02B 3/04*  (2006.01)
  *G09G 3/34*  (2006.01)

(52) U.S. Cl.
  CPC .......... *G02B 3/0043* (2013.01); *G02B 3/0056* (2013.01); *G02B 3/04* (2013.01); *G09G 3/342* (2013.01); *G02B 2003/0093* (2013.01)

(58) Field of Classification Search
  CPC ...... G02B 3/0043; G02B 3/0056; G02B 3/04; G02B 3/342; G02B 2003/0093
  See application file for complete search history.

(56) References Cited

U.S. PATENT DOCUMENTS

| | | | |
|---|---|---|---|
| 7,121,693 B2 * | 10/2006 | Klose | F21V 5/002 362/268 |
| 7,483,215 B2 * | 1/2009 | Raymond | G02B 30/27 359/627 |
| 7,687,757 B1 | 3/2010 | Tseng et al. | |
| 2003/0035220 A1 | 2/2003 | Hawver | |
| 2003/0038999 A1 | 2/2003 | Knox et al. | |
| 2006/0023314 A1 | 2/2006 | Boettiger et al. | |
| 2008/0037131 A1 * | 2/2008 | Steenblik | B42D 25/378 359/619 |
| 2015/0001662 A1 | 1/2015 | Kawabata et al. | |
| 2015/0192705 A1 | 7/2015 | Nimura | |
| 2016/0146981 A1 | 5/2016 | Kawabata et al. | |

FOREIGN PATENT DOCUMENTS

| | | |
|---|---|---|
| CN | 1407369 A | 4/2003 |
| CN | 101795364 A | 8/2010 |
| JP | 2003-195216 A | 7/2003 |
| JP | 2004-037873 A1 | 2/2004 |
| JP | 2005-352392 A | 12/2005 |
| JP | 2015-216696 A | 12/2015 |

OTHER PUBLICATIONS

The Chinese Office Action dated Sep. 28, 2023 in a counterpart Chinese patent application.

* cited by examiner

*Primary Examiner* — Anne M Hines
(74) *Attorney, Agent, or Firm* — METROLEX IP LAW GROUP, PLLC

(57) ABSTRACT

A lens array included in a display switching device according to one or more embodiments may include a portion having a greater average of curvature radii of microlenses at a greater distance from a predetermined lens reference position on a surface of the lens array including the microlenses.

20 Claims, 21 Drawing Sheets

FIG. 17

| Shape | Sample 1 | Sample 2 | Sample 3 | Sample 4 | Sample 5 |
|---|---|---|---|---|---|
| Result | More crosstalk | Less crosstalk | – | Less crosstalk | More crosstalk |

DISPLAY SWITCHING DEVICE

CROSS-REFERENCE TO RELATED APPLICATION

This application claims priority to Japanese Patent Application No. 2021-041190 filed on Mar. 15, 2021, the contents of which are incorporated herein by reference.

FIELD

The disclosure relates to a display switching device.

BACKGROUND

FIG. 33 is a schematic diagram of a related display switching device described in Patent Literature 1. As shown in FIG. 33, a display unit 100 includes multiple pixels each having two pixel regions (a triangle and a circle). Light 103 from a light source 102 passes through a lenticular lens 101 including multiple microlenses and enters seven pixels that are arranged vertically. The pixel regions (triangles or circles) to be displayed can be selected by changing the angle at which the light 103 from the light source 102 enters the lenticular lens 101 to change the focal point at which the light is focused by the lenticular lens 101. More specifically, selecting multiple triangle pixel regions causes a first pattern to appear, and selecting multiple circle pixel regions causes a second pattern to appear. The light source 102 is movable in C-direction in the figure.

FIG. 34 is a schematic diagram of a related display switching device 200 including a substrate 202, a first light source 201A for causing a display unit 204 to display a first pattern, a second light source 201B for causing the display unit 204 to display a second pattern, a lens array 203 including multiple lenses, and the display unit 204. The display switching device 200 can switch between displaying the first pattern and displaying the second pattern on the display unit 204 by turning on the first light source 201A or the second light source 201B.

CITATION LIST

Patent Literature

Patent Literature 1: Japanese Unexamined Patent Application Publication No. 2003-195216

SUMMARY

In the related display switching device described in Patent Literature 1, the light 103 from the light source 102 enters the vertically-arranged seven pixels through the lenticular lens 101. The light 103 entering the lenticular lens 101 at wider angles is focused inappropriately due to aberration and causes image crosstalk. In particular, the top and bottom pixels of the vertically-arranged seven pixels have high levels of crosstalk between the triangle pixel region and the circle pixel region. Crosstalk in the present example refers to the circle pixel region appearing when the triangle pixel region is to appear and the triangle pixel region appearing when the circle pixel region is to appear, thus degrading image quality. The crosstalk issue cannot be eliminated by moving the light source 102 in C-direction in the figure.

Similarly in the related display switching device 200 shown in FIG. 34, light from the single first light source 201A enters the first pixel regions 205A and 205A' in the display unit 204 through the lens array 203, and light emitted from the single second light source 201B enters the second pixel regions 205B and 205B' in the display unit 204 through the lens array 203. For the second pixel region 205B, light from the second light source 201B enters the lens array 203 at narrow angles and is focused appropriately on the upper surface (S1 in the figure) of the display unit 204 without causing image crosstalk. For the first pixel region 205A as well, light from the first light source 201A enters the lens array 203 at narrow angles and is focused appropriately on the upper surface (S2 in the figure) of the display unit 204 without causing image crosstalk. For the second pixel region 205B' as well, light from the second light source 201B enters the lens array 203 at relatively narrow angles and is focused appropriately on the boundary between the lens array 203 and the display unit 204 (S3 in the figure) without causing a high level of image crosstalk. In contrast, for the first pixel region 205A', light from the first light source 201A enters the lens array 203 at wide angles and is focused inappropriately on a position in the lens array 203 far distant from the display unit 204 (S4 in the figure), causing image crosstalk. Crosstalk in this example refers to the second pixel regions 205B and 205B' appearing when the first pixel regions 205A and 205A' are to appear and the first pixel regions 205A and 205A' appearing when the second pixel regions 205B and 205B' are to appear, thus degrading image quality.

One or more embodiments are directed to a display switching device having less image quality degradation resulting from image crosstalk.

A display switching device according to one or more embodiments is a device for switching display images by switching light illumination from a plurality of light sources. The device includes a lens array including a plurality of lenses, and a display unit including a plurality of pixel regions. The plurality of pixel regions allow passage of light emitted from the plurality of light sources and focused by the plurality of lenses included in the lens array. Each of the plurality of pixel regions has a transmittance corresponding to a predetermined static pattern. The plurality of lenses include a spherical lens or lenses. The lens array includes a portion having a greater average of curvature radii of lenses of the plurality of lenses at a greater distance from a predetermined lens reference position on a surface of the lens array including the plurality of lenses.

The display switching device with the structure may have less image quality degradation resulting from image crosstalk.

In a display switching device according to one or more embodiments, a light source reference position is at a predetermined position on a light source placement surface receiving the plurality of light sources. Each of the curvature radii is a value greater than or equal to R satisfying a formula of $\cos \theta/L + n \cos \theta/(T - R(1 - \cos \theta)) = (n-1)/R$, where $\theta$ is an angle between a straight line connecting the light source reference position and a center of a sphere defined by a spherical surface of a corresponding lens of the plurality of lenses and a direction perpendicular to the light source placement surface, L is a distance from the light source reference position to the lens array, n is a refractive index of a material included in the lens array, and T is a thickness of the lens array.

A display switching device according to one or more embodiments is a device for switching display images by switching light illumination from a plurality of light sources. The device may include a lens array including a plurality of lenses, and a display unit including a plurality of pixel regions. The plurality of pixel regions allow passage of light emitted from the plurality of light sources and focused by the plurality of lenses included in the lens array. Each of the plurality of pixel regions has a transmittance corresponding to a predetermined static pattern. The plurality of lenses may include at least one aspheric lens.

The display switching device with the structure may have less image quality degradation resulting from image crosstalk.

In a display switching device according to one or more embodiments, the lens array may include a portion having a greater average of focal lengths of the at least one aspheric lens at a greater distance from a predetermined lens reference position on a surface of the lens array including the plurality of lenses.

In a display switching device according to one or more embodiments, the lens array may include a portion having a greater average of shifts of the at least one aspheric lens from a spherical shape at a greater distance from a predetermined lens reference position on a surface of the lens array including the plurality of lenses.

In a display switching device according to one or more embodiments, a light source reference position may be at a predetermined position on a light source placement surface receiving the plurality of light sources. The at least one aspheric lens may have a curved surface being line-symmetric about a central axis being a straight line connecting the light source reference position and a predetermined position on the at least one aspheric lens.

In a display switching device according to one or more embodiments, the curved surface being line-symmetric may include a surface of a spheroid.

In a display switching device according to one or more embodiments, the lens reference position may be at a center of gravity of the lens array.

In a display switching device according to one or more embodiments, the lens reference position may include an intersection between the surface of the lens array and a perpendicular line from a center of gravity of the plurality of light sources to the surface of the lens array.

In a display switching device according to one or more embodiments, the light source reference position may be at a center of gravity of the plurality of light sources.

In a display switching device according to one or more embodiments, the light source reference position for each of the plurality of lenses may be at a light source of the plurality of light sources farthest from the lens.

In a display switching device according to one or more embodiments, the lens array may have a constant thickness.

A display switching device according to one or more embodiments is a device for switching display images by switching light illumination from a plurality of light sources. The device may include a lens array including a plurality of lenses, and a display unit including a plurality of pixel regions. The plurality of pixel regions allow passage of light emitted from the plurality of light sources and focused by the plurality of lenses included in the lens array. Each of the plurality of pixel regions may have a transmittance corresponding to a predetermined static pattern. The lens array may include a portion having a less lens thickness at a greater distance from a predetermined lens reference position on a surface of the lens array including the plurality of lenses.

The display switching device with the structure may have less image quality degradation resulting from image crosstalk.

In a display switching device according to one or more embodiments, a surface of the lens array farther from the plurality of light sources may be flat.

In a display switching device according to one or more embodiments, the plurality of lenses may have vertices on a same plane.

A display switching system according to one or more embodiments includes a plurality of the display switching devices according to one or more embodiments. The plurality of display switching devices may include the display units adjacent to each other.

The display switching system with the structure may allow display of larger images or images with any shapes.

A switch according to one or more embodiments may include the display switching device according to any one or more embodiments. The switch may detect a user operation on the display switching device.

The switch with the structure may have less image quality degradation resulting from image crosstalk.

An electrical apparatus according to one or more embodiments may include the switch. The electrical apparatus may be operable with the switch.

The electrical apparatus with the structure may include the switch having less image quality degradation resulting from image crosstalk.

The display switching device according to one or more embodiments may have less image quality degradation resulting from image crosstalk.

BRIEF DESCRIPTION OF THE DRAWINGS

FIG. 17 is a diagram illustrating a table showing a reduction levels of image crosstalk for aspheric lenses with different shapes.

DETAILED DESCRIPTION

Figure 1:
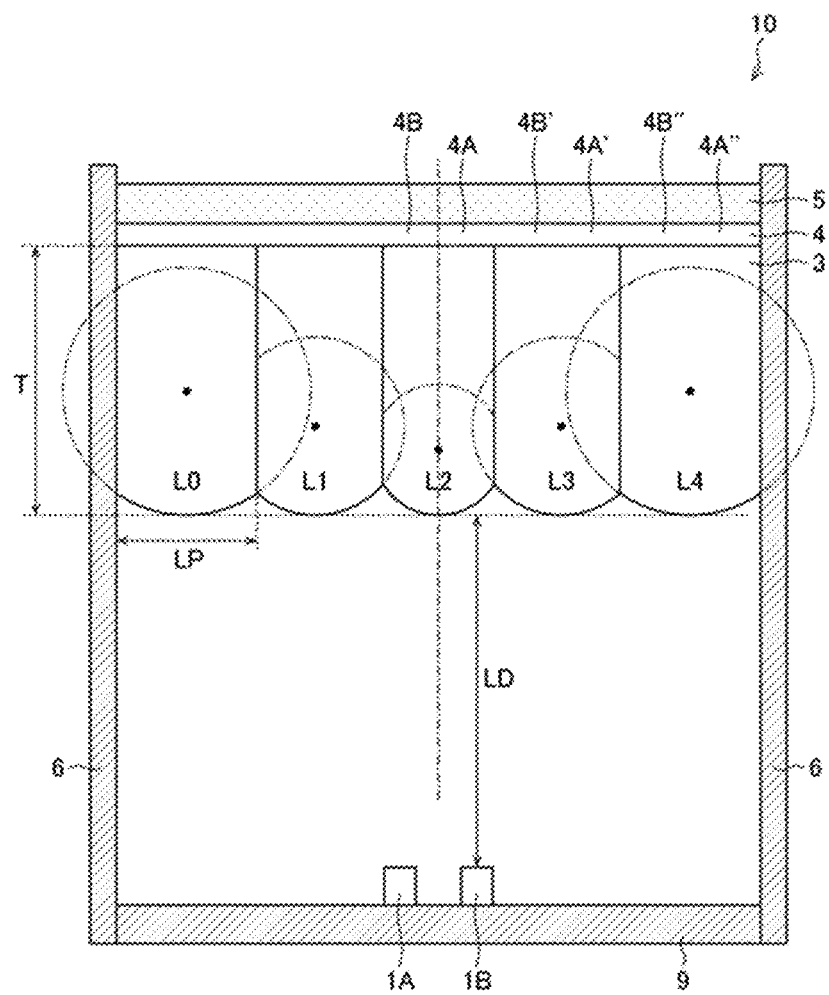
FIG. 1 is a schematic diagram illustrating a display switching device according to a first embodiment or embodiments.

One or more embodiments will now be described with reference to the drawings For ease of explanation, the components with the same functions as the components described in a specific embodiment are given the same reference numerals and will not be described.

First Embodiment

FIG. 1 is a schematic diagram of a display switching device 10 according to a first embodiment. As shown in FIG. 1, the display switching device 10 includes, from bottom to top in the figure, a substrate 9, multiple light sources 1A and 1B, a lens array 3 including multiple microlenses L0 to L4, a display unit 4 including multiple pixel regions 4A, 4A', and 4A" for displaying a first pattern (static pattern) and multiple pixel regions 4B, 4B', and 4B" for displaying a second pattern (static pattern), and a light diffuser 5. The lens array 3, the display unit 4, and the light diffuser 5 are supported by a housing 6, which is joined to the substrate 9 receiving the light sources 1A and 1B to be the display switching device 10. The display switching device 10 may further include a protective layer over the light diffuser 5 for damage prevention.

At least the housing 6 or the substrate 9 may be formed from a light-absorbing material. Accordingly, the likelihood that light reflected by the lens array 3 or the display unit 4 again passes through the lens array 3 and the display unit 4 to be viewed by a user is reduced. The likelihood that the internal reflection of ambient light causes the image on the pixel regions 4A, 4A', 4A", 4B, 4B', and 4B" in the display unit 4 to appear faintly without the light sources 1A and 1B being turned on may also be reduced.

In the present embodiment or embodiments, the light sources 1A and 1B in the display switching device 10 are point light-emitting diodes (LEDs) (e.g., RGB LEDs). However, the light sources 1A and 1B may be of any type such as light guide rods or a light guide that allows emission of light in predetermined regions alone (described later). The light sources may emit laser beams. An RGB LED includes a package of a red LED, a green LED, and a blue LED as a single light source. The brightness of each color of the LED is separately controllable. In the present embodiment or embodiments, the display switching device 10 includes four light sources in a first light source group including the light source 1A and four light sources in a second light source group including the light source 1B. In some embodiments, the display switching device 10 may include any number of light sources of any size at any distance from one another as appropriate.

In the present embodiment or embodiments, the lens array 3 includes the microlenses L0 to L4 having different curvature radii and thus having different lens pitches LP. The microlenses L0 to L4 in the lens array 3 each have its thickest portion with a constant thickness T (e.g., 0.5 mm). The lens array 3 has a refractive index of 1.5 and a minimum distance LD of 30 mm between the microlenses L0 to L4 and the light sources 1A and 1B. However, the lens array 3 may have any number of microlenses with any lens pitch LP, any thickness, any refractive index, and any minimum distance LD between the microlenses and the light sources as appropriate. The light diffuser 5 may be eliminated as appropriate.

Figure 2:
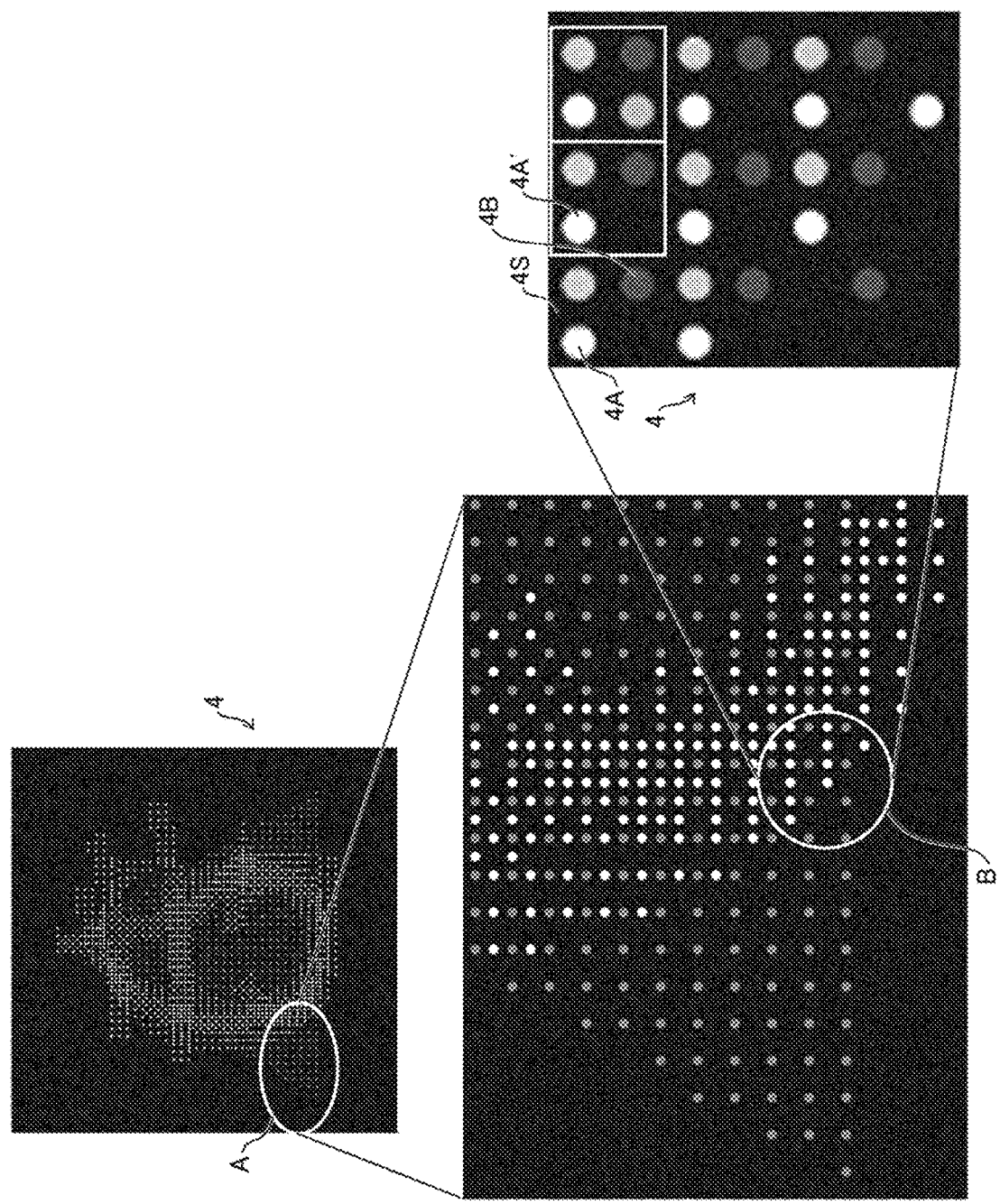
FIG. 2 is a schematic diagram illustrating a display unit included in a display switching device according to a first embodiment or embodiments.

FIG. 2 is a schematic diagram of the display unit 4 included in the display switching device 10.

Figure 3:
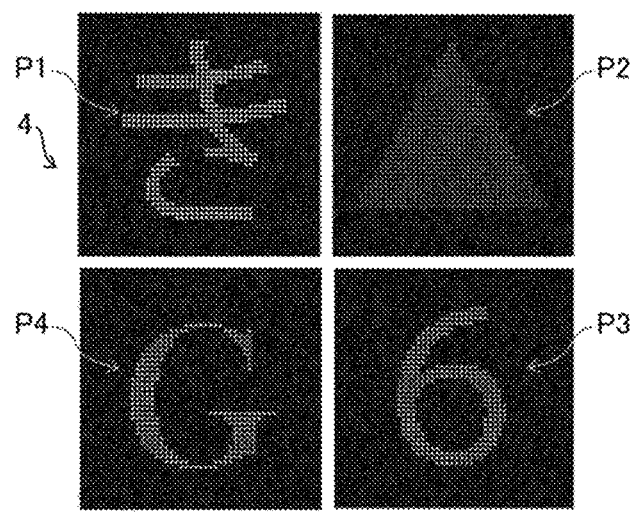
FIG. 3 is a diagram illustrating a display unit included in a display switching device according to a first embodiment, showing switching display examples.

FIG. 3 is a diagram of the display unit 4 included in the display switching device 10 showing switching display examples.

As shown in FIG. 2, the display unit 4 displays predetermined patterns such as the first pattern and the second pattern in a switchable manner. FIG. 2 includes an enlarged view of portion A in the display unit 4 and an enlarged view of portion B in the enlarged view of portion A in the display unit 4. The display unit 4 includes multiple pixel regions 4A, 4A', and 4A" for displaying a first pattern P1 shown in FIG. 3 (Japanese hiragana character ki in this example), multiple pixel regions 4B, 4B', and 4B" for displaying a second pattern P2 shown in FIG. 3 (a triangle pattern A in this example), and a portion 4S other than the pixel regions 4A, 4A', 4A", 4B, 4B', and 4B". The pixel regions 4A, 4A', 4A", 4B, 4B', and 4B" are openings to allow passage of light from the light source 1A and the light source 1B and display the first pattern P1 or the second pattern P2. The portion 4S other than the pixel regions 4A, 4A', 4A", 4B, 4B', and 4B" serves as a mask with a lower transmittance of light from the light source 1A and the light source 1B than the pixel regions 4A, 4A', 4A", 4B, 4B', and 4B". The portion 4S other than the pixel regions 4A, 4A', 4A", 4B, 4B', and 4B" may be, for example, a highly light-shielding black matrix. However, the portion 4S may be formed from any material that achieves a lower transmittance of light from the light source 1A and the light source 1B than the pixel regions 4A, 4A', 4A", 4B, 4B', and 4B". The display unit 4 may be located on a substrate that transmits visible light. In the present embodiment or embodiments, the display unit 4 includes, for example, a single black matrix layer. The structure is not limited to this example. For example, the display unit 4 may include two layers. In this case, the layers may include a first layer as a lower layer nearer the light sources 1A and 1B and a second layer as an upper layer. The first layer may include multiple openings or transmission regions with a predetermined transmittance to allow passage of light to the pixel regions 4A, 4A', 4A", 4B, 4B", and 4B" included in the second layer. The second layer, which is the upper layer farther from the light source 1A and the light source 1B, includes the pixel regions 4A, 4A', 4A", 4B, 4B", and 4B".

Figure 4:
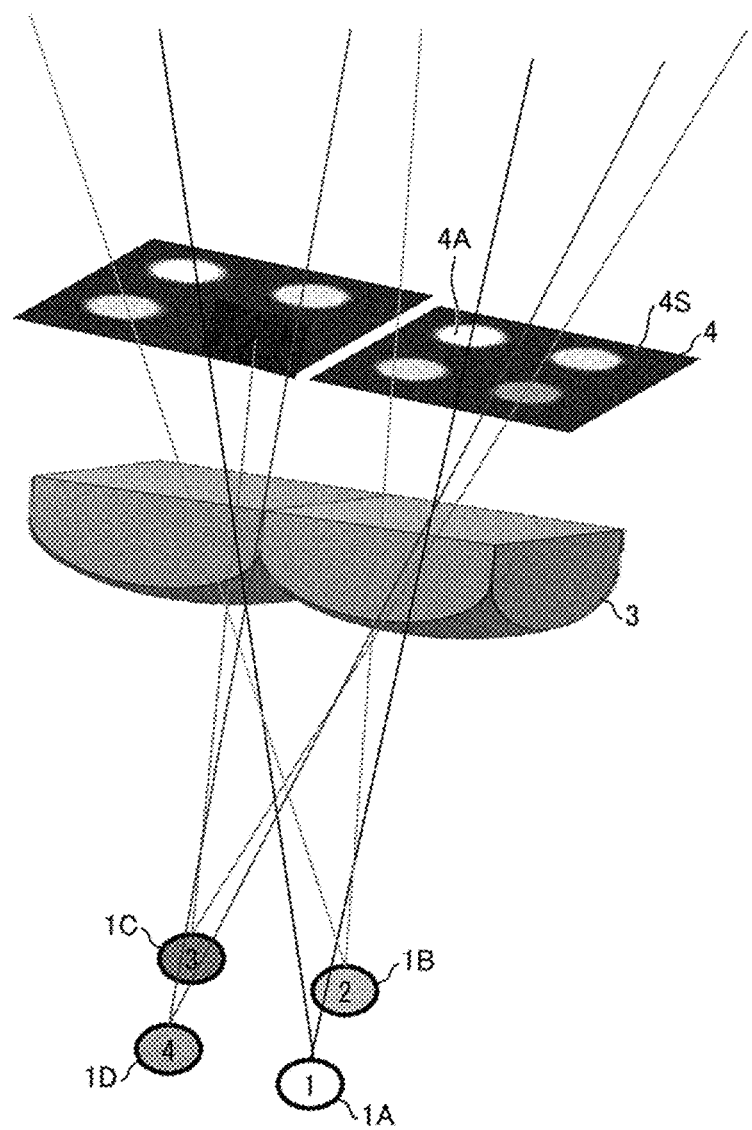
FIG. 4 is a diagram illustrating a correspondence of light sources to a display unit and a lens array for a display switching device according to a first embodiment or embodiments.

FIG. 4 is a diagram describing the correspondence of light sources to a display unit and a lens array for the display switching device according to the first embodiment or embodiments.

As described above, in the present embodiment or embodiments, the first pattern P1 shown in FIG. 3 is displayed with the pixel regions 4A, 4A', and 4A", and the second pattern P2 shown in FIG. 3 is displayed with the pixel regions 4B, 4B', and 4B". However, the structure is not limited to this example. As shown in FIG. 4, in addition to the light source 1A included in the first light source group and the light source 1B included in the second light source group, a light source 1C included in a third light source group and a light source 1D included in a fourth light source group may emit light toward their respective pixel regions. In this case, the display may be switched between patterns including a third pattern P3 and a fourth pattern P4 in addition to the first pattern P1 and the second pattern P2 as shown in FIG. 3.

Figure 5:
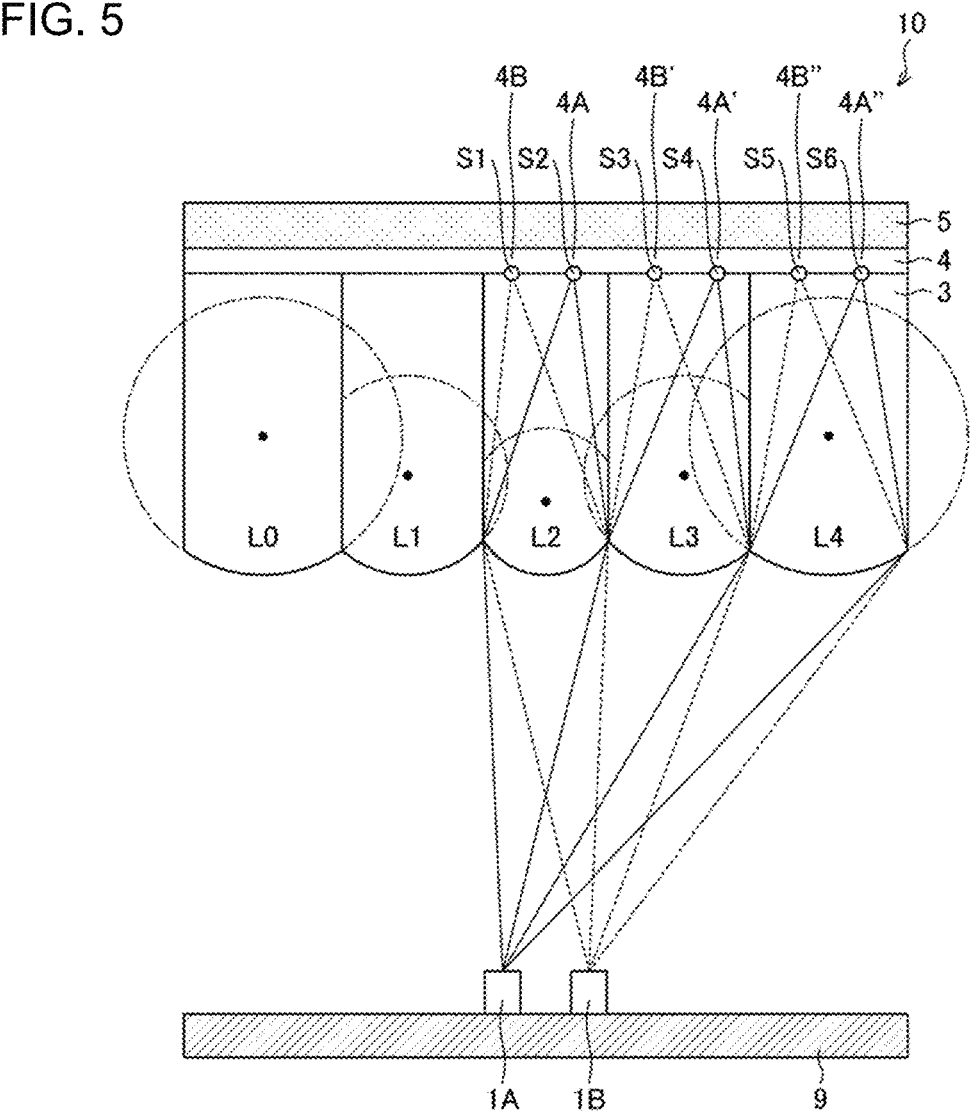
FIG. 5 is a diagram illustrating an optical effect produced by a display switching device according to a first embodiment or embodiments, such as is shown in FIG. 1.

FIG. 5 is a diagram describing an optical effect produced by the display switching device 10 according to the first embodiment or embodiments shown in FIG. 1.

The display switching device 10 switches the display images by switching between light illumination from the first light source group including the light source 1A and light illumination from the second light source group including the light source 1B.

For the display switching device 10 shown in FIG. 5, light emitted from the light source 1A enters the first pixel regions 4A, 4A', and 4A" in the display unit 4 through the microlenses L2 to L4 in the lens array 3, and light emitted from the second light source 1B enters the second pixel regions 4B, 4B', and 4B" in the display unit 4 through microlenses L2 to L4 in the lens array 3.

For the first pixel region 4A, light from the light source 1A enters the lens array 3 at narrow angles. For the first pixel region 4A', light from the light source 1A enters the lens array 3 at moderate angles. For the first pixel region 4A", light from the light source 1A enters the lens array 3 at wide angles. With a known lens array, the focal points of the light rays for the first pixel region 4A, the first pixel region 4A', and the first pixel region 4A" are thus nearer the substrate 9 in the stated order. With a known lens array, crosstalk can thus occur in the first pixel region 4A' and the first pixel region 4A". The display switching device 10 includes the lens array 3 including microlenses L0 to L4, each of which is a spherical lens. The lens array 3 includes a portion having greater averages of the curvature radii of microlenses at greater distances from a predetermined reference position (in this example, the microlens L2, which is the lens reference position at the center of gravity of the lens array 3) on the surface of the lens array including the microlenses L0 to L4. This structure aligns the focal points S2, S4, and S6 of light from the light source 1A to the lower surface of the display unit 4. This eliminates image crosstalk in the first pixel regions 4A, 4A', and 4A". The display switching device 10 thus has less image quality degradation resulting from image crosstalk.

For the second pixel region 4B, light from the light source 1B enters the lens array 3 at narrow angles. For the second pixel region 4B', light from the light source 1B enters the lens array 3 at moderate angles. For the second pixel region 4B", light from the light source 1B enters the lens array 3 at wide angles. With a known lens array, the focal points of the light for the second pixel region 4B" are thus nearer the substrate 9 than the focal points of light for the second pixel region 4B'. With a known lens array, crosstalk can thus occur in the second pixel region 4B". The lens array 3 in the display switching device 10 thus includes a portion having greater averages of the curvature radii of microlenses at greater distances from a predetermined reference position (the microlens L2 in this example) on the surface of the lens array including the microlenses L0 to L4. This structure aligns the focal points S1, S3, and S5 of light from the light source 1B to the lower surface of the display unit 4. This eliminates image crosstalk in the second pixel regions 4B, 4B', and 4B". The display switching device 10 thus has less image quality degradation resulting from image crosstalk.

Figure 6:
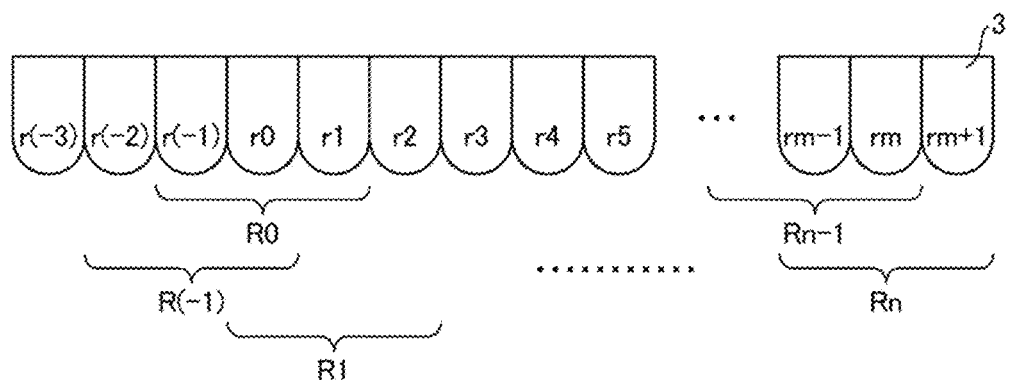
FIG. 6 is a diagram illustrating a lens array included in a display switching device according to a first embodiment or embodiments, such as is shown in FIG. 1.

FIG. 6 is a diagram describing the lens array 3 included in the display switching device 10 according to the first embodiment or embodiments shown in FIG. 1.

With reference to FIG. 6, the greater averages of the curvature radii of microlenses at greater distances from the predetermined lens reference position (microlens r0 in FIG. 6) will now be described. In this example, the average of the curvature radii of three microlenses adjacent to each other is used. However, the average of the curvature radii may be the average of any two or more microlenses adjacent to each other. For example, R(−2) is the average of the curvature radii of three adjacent microlenses r(−3), r(−2), and r(−1), R(−1) is the average of the curvature radii of three adjacent microlenses r(−2), r(−1), and r0, R0 is the average of the curvature radii of three adjacent microlenses r(−1), r0, and r1, R1 is the average of the curvature radii of three adjacent microlenses r0, r1, and r2, and R2 is the average of the curvature radii of three adjacent microlenses r1, r2, and r3. At greater distances from the predetermined lens reference position (microlens r0 in FIG. 6), the averages of the curvature radii of microlenses are greater, thus satisfying R0<R1<R2< . . . <Rn−1<Rn and R0<R(−1)< R(−2)< . . . <R(−n).

Figure 7:
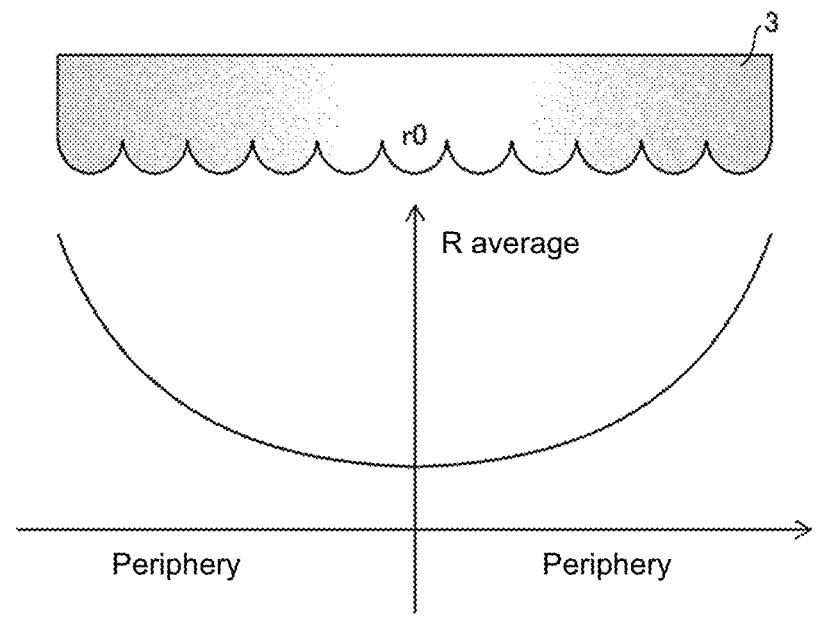
FIG. 7 is a diagram illustrating characteristics of a lens array included in a display switching device according to a first embodiment or embodiments, such as is shown in FIG. 1.

FIG. 7 is a diagram describing the characteristics of the lens array 3 included in the display switching device 10 according to the first embodiment or embodiments shown in FIG. 1.

As shown in FIG. 7, the lens array 3 included in the display switching device 10 has greater averages of the curvature radii of microlenses (each being the average of the curvature radii of three microlenses adjacent to each other) at greater distances from a predetermined lens reference position (microlens r0). In other words, the averages of the curvature radii of the microlenses in the lens array 3 are greater at less distances from the periphery. The display switching device 10 with the structure has less image quality degradation resulting from image crosstalk.

Figure 8:
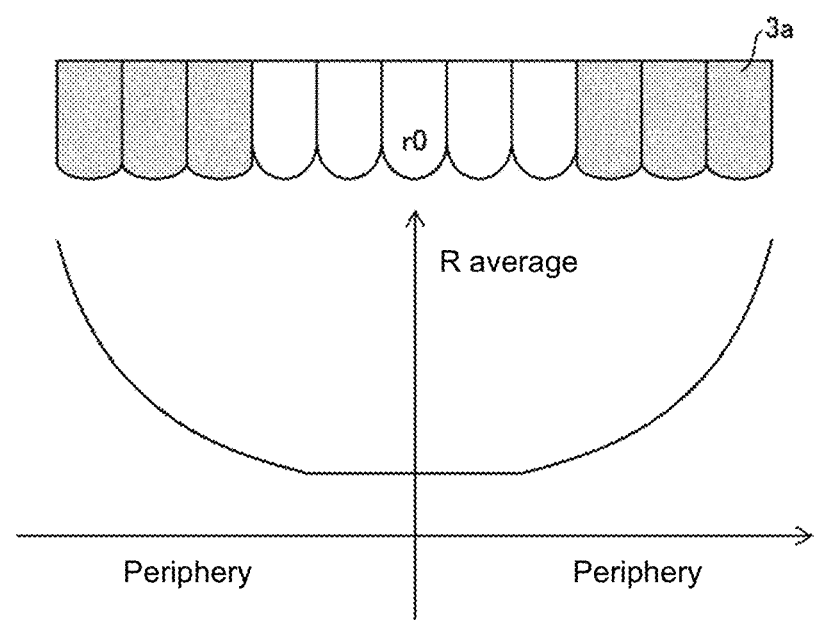
FIG. 8 is a diagram illustrating a characteristics of another lens array for a display switching device according to a first embodiment or embodiments, such as is shown in FIG. 1.

FIG. 8 is a diagram describing the characteristics of another lens array 3a for the display switching device 10 according to the first embodiment or embodiments shown in FIG. 1.

As shown in FIG. 8, the lens array 3a for the display switching device 10 has greater averages of the curvature radii of microlenses (each being the average of the curvature radii of three microlenses adjacent to each other) at greater distances from a predetermined lens reference position (microlens r0). More specifically, the averages of the curvature radii of the microlenses in the lens array 3a are constant in the middle portion but are greater at less distances from the periphery. The display switching device 10 with the structure has less image quality degradation resulting from image crosstalk.

Figure 9:
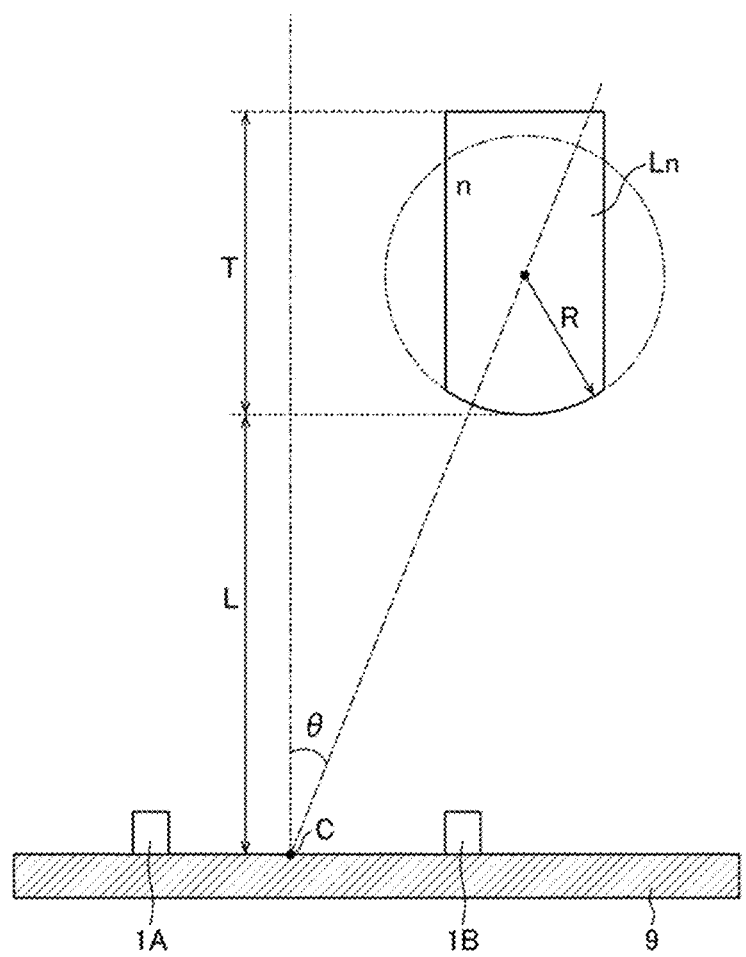
FIG. 9 is a diagram illustrating an example manner of determining a curvature radius of a microlens in a lens array included in a display switching device according to the first embodiment or embodiments, such as is shown in FIG. 1.

FIG. 9 is a diagram describing an example manner of determining the curvature radius R of a microlens Ln in the lens array 3 included in the display switching device 10 according to the first embodiment or embodiments shown in FIG. 1.

As shown in FIG. 9, a light source reference position C is at a predetermined position on the surface (upper surface) of the substrate 9 receiving the light sources 1A and 1B, or in other words, on the light source placement surface. The curvature radius R may be a value greater than or equal to R satisfying the formula of $\cos \theta/L + n \cos \theta/(T - R(1 - \cos \theta)) = (n-1)/R$, where $\theta$ is the angle between the straight line connecting the light source reference position C and the center of the sphere defined by the spherical surface of the microlens Ln and the direction perpendicular to the light source placement surface, L is the distance from the light source reference position C to the lens array 3, n is the refractive index of the material from which the lens array 3 is formed, and T is the thickness of the lens array 3.

Figure 10:
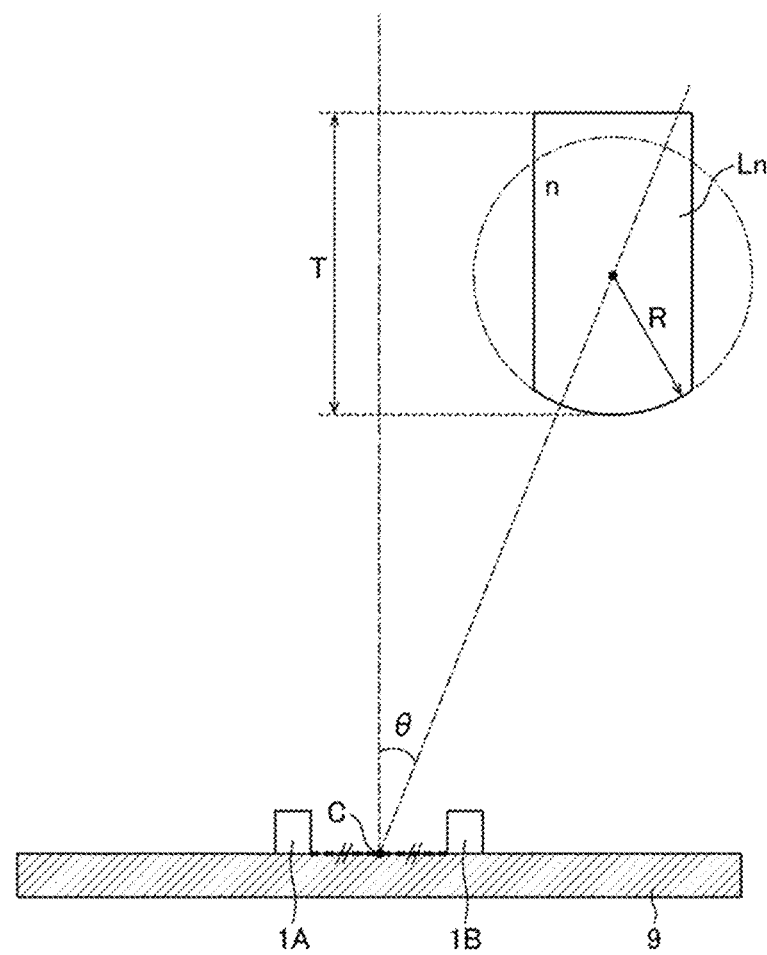
FIG. 10 is a diagram illustrating another example manner of determining a curvature radius of a microlens in a lens array included in a display switching device according to a first embodiment or embodiments, such as is shown in FIG. 1.

FIG. 10 is a diagram describing another example manner of determining the curvature radius R of a microlens Ln in the lens array 3 included in the display switching device 10 according to the first embodiment or embodiments shown in FIG. 1.

As shown in FIG. 10, a light source reference position C is at the same distance from the light source 1A and from the light source 1B on the surface (upper surface) of the substrate 9 receiving the light sources 1A and 1B, or in other words, on the light source placement surface. The curvature radius R may be a value greater than or equal to R satisfying the formula of $\cos \theta/L + n \cos \theta/(T - R(1 - \cos \theta)) = (n-1)/R$, where $\theta$ is the angle between the straight line connecting the light source reference position C and the center of the sphere defined by the spherical surface of the microlens Ln and the direction perpendicular to the light source placement surface, L is the distance from the light source reference position C to the lens array 3, n is the refractive index of the material from which the lens array 3 is formed, and T is the thickness of the lens array 3.

Figure 11:
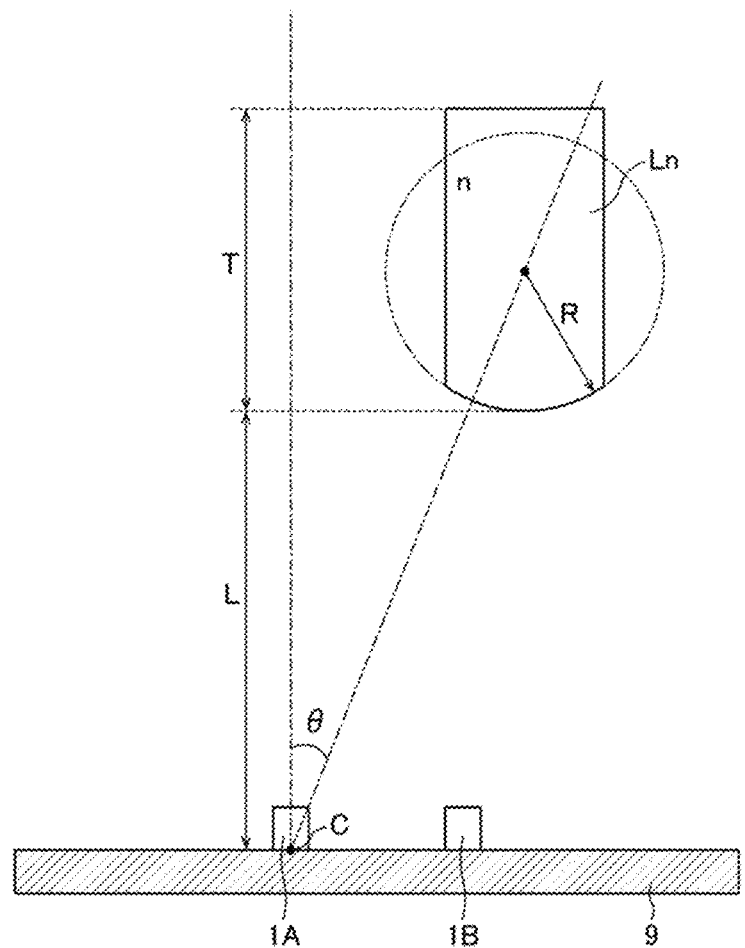
FIG. 11 is a diagram illustrating still another example manner of determining a curvature radius of a microlens in a lens array included in a display switching device according to a first embodiment or embodiments, such as is shown in FIG. 1.

FIG. 11 is a diagram describing still another example manner of determining the curvature radius R of a microlens Ln in the lens array 3 included in the display switching device 10 according to the first embodiment or embodiments shown in FIG. 1.

As shown in FIG. 11, a light source reference position C is in the middle of the light source 1A farther from the microlens Ln than the light source 1B on the surface (upper surface) of the substrate 9 receiving the light sources 1A and 1B, or in other words, on the light source placement surface. The curvature radius R may be a value greater than or equal to R satisfying the formula of $\cos \theta/L + n \cos \theta/(T - R(1 - \cos \theta)) = (n-1)/R$, where $\theta$ is the angle between the straight line connecting the light source reference position C and the center of the sphere defined by the spherical surface of the microlens Ln and the direction perpendicular to the light source placement surface, L is the distance from the light source reference position C to the lens array 3, n is the refractive index of the material from which the lens array 3 is formed, and T is the thickness of the lens array 3.

Second Embodiment

A second embodiment or embodiments will now be described with reference to FIGS. 12, 13, 14, 15, 16, 17, 18, 19, 20, 21, 22, 23, 24, 25, 26, 27, and 28. The display switching device according to the present embodiment or embodiments differs from the display switching device according to the first embodiment or embodiments in including aspheric microlenses in the lens array. The other details are the same as in the first embodiment. For ease of explanation, the components with the same functions as the components shown in the figures for the first embodiment are given the same reference numerals and will not be described.

Figure 12:
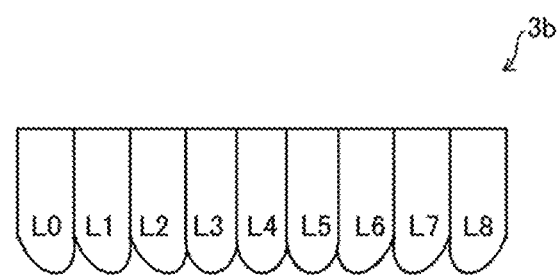
FIG. 12 is a schematic diagram illustrating a lens array including aspheric lenses included in a display switching device according to a second embodiment or embodiments.

FIG. 12 is a schematic diagram of a lens array 3b including aspheric lenses included in the display switching device according to the second embodiment or embodiments.

As shown in FIG. 12, the lens array 3b includes the spherical microlenses L3 to L5 in the middle portion with a low degree of aberration, and aspherical microlenses L0 to L2 and L6 to L8 in the peripheral portion with a high level of aberration.

The lens array 3b may include a portion having greater averages of focal lengths of the aspheric lenses at greater distances from a predetermined lens reference position (microlens L4 in this example) on the surface of the lens array including the microlenses L0 to L8.

The display switching device with the structure has less image quality degradation resulting from image crosstalk.

Figure 13:
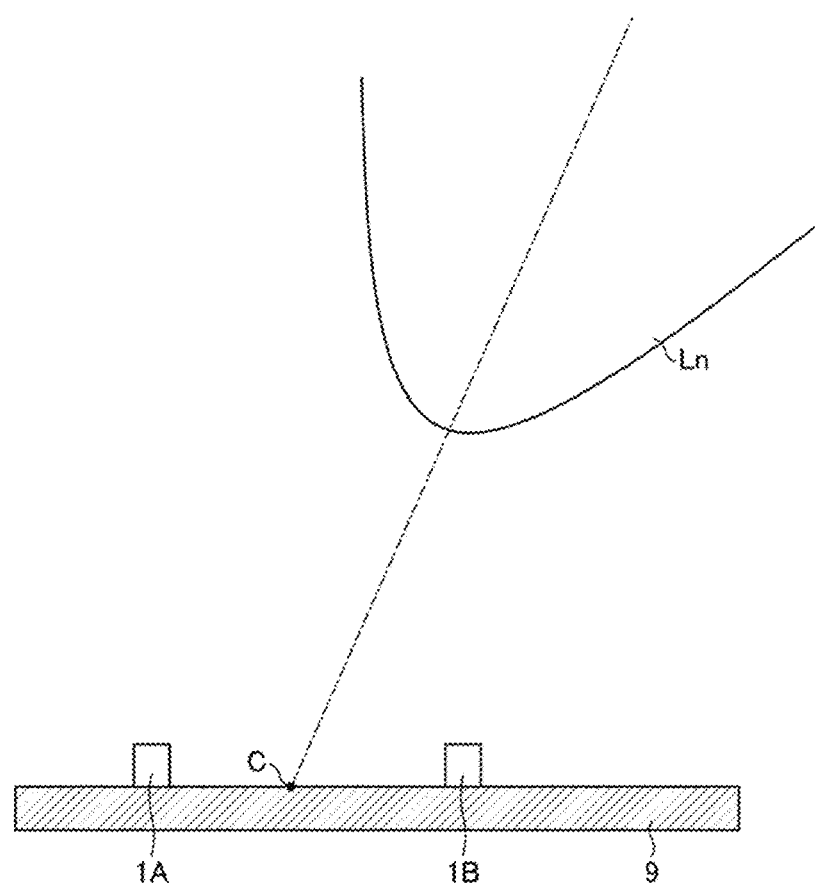
FIG. 13 is a diagram illustrating an aspheric lens in a lens array included in a display switching device according to a second embodiment or embodiments, showing its example shape.

FIG. 13 is a diagram of an aspheric lens in the lens array included in the display switching device according to the second embodiment or embodiments, showing its example shape.

As shown in FIG. 13, an aspheric microlens Ln in the lens array 3b may include a curved surface line-symmetric about a center axis that is a straight line connecting a predetermined position on the aspheric microlens Ln and a light source reference position C. The light source reference position C is at a predetermined position on the surface (upper surface) of the substrate 9 receiving the light sources 1A and 1B, or in other words, on its light source placement surface.

Figure 14:
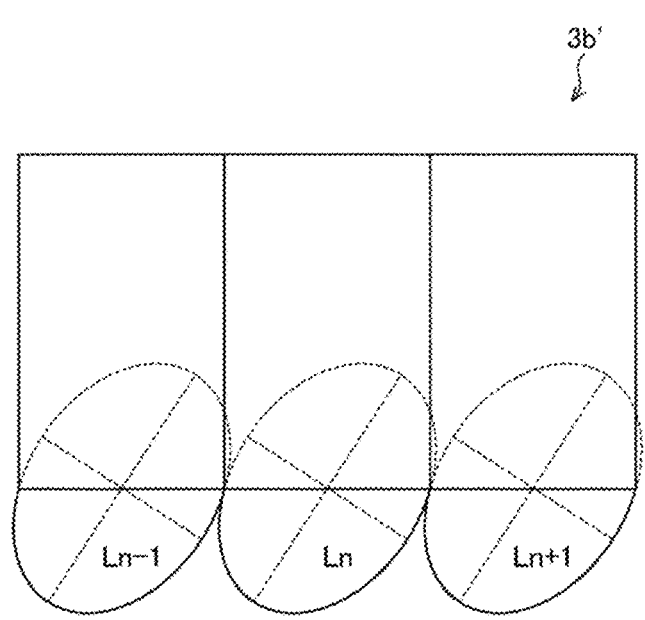
FIG. 14 is a schematic diagram illustrating a lens array including elliptical aspheric lenses for a display switching device according to a second embodiment or embodiments.

FIG. 14 is a schematic diagram of a lens array 3b' including elliptical aspheric lenses for the display switching device according to the second embodiment or embodiments.

As shown in FIG. 14, the display switching device may include the lens array 3b' that includes elliptical aspheric microlenses Ln−1 to Ln+1. The elliptical aspheric lenses each have a spheroid surface as a line-symmetric curved surface.

Figure 15:
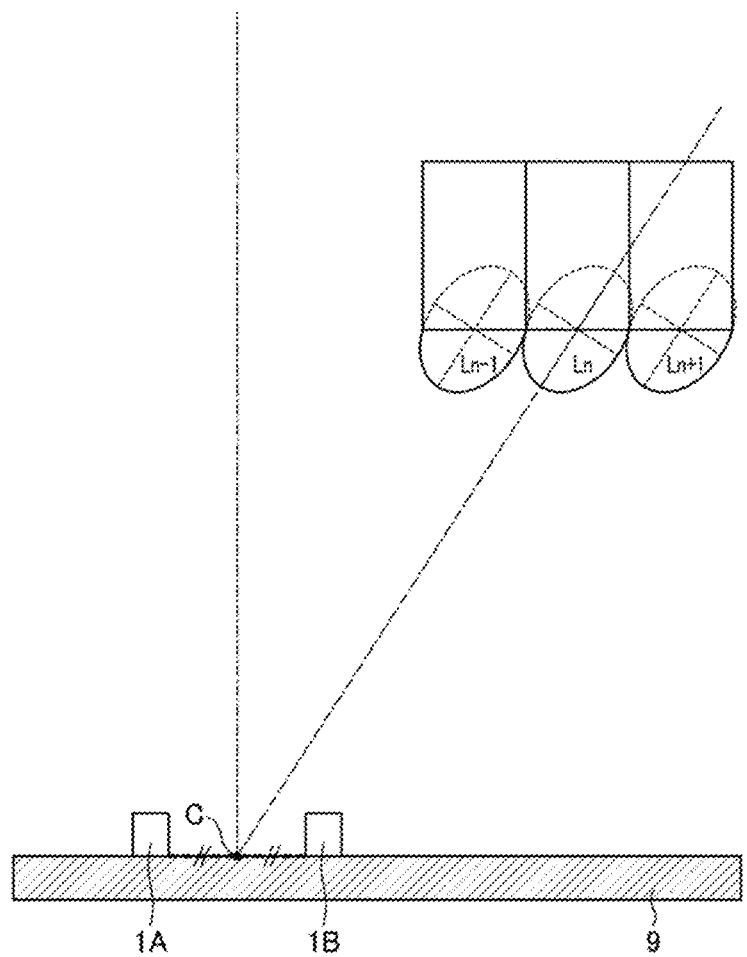
FIG. 15 is a diagram illustrating an example manner of determining a shape of a elliptical aspheric lenses, such as is shown in FIG. 14.

FIG. 15 is a diagram describing an example manner of determining the shape of an elliptical aspheric lens shown in FIG. 14.

As shown in FIG. 15, the elliptical aspheric microlens Ln in the lens array 3b' may include a curved surface line-symmetric about a center axis that is a straight line connecting a predetermined position on the elliptical aspheric microlens Ln and a light source reference position C. The light source reference position C is at the same distance from the light source 1A and from the light source 1B on the surface (upper surface) of the substrate 9 receiving the light sources 1A and 1B, or in other words, on its light source placement surface.

Figure 16:
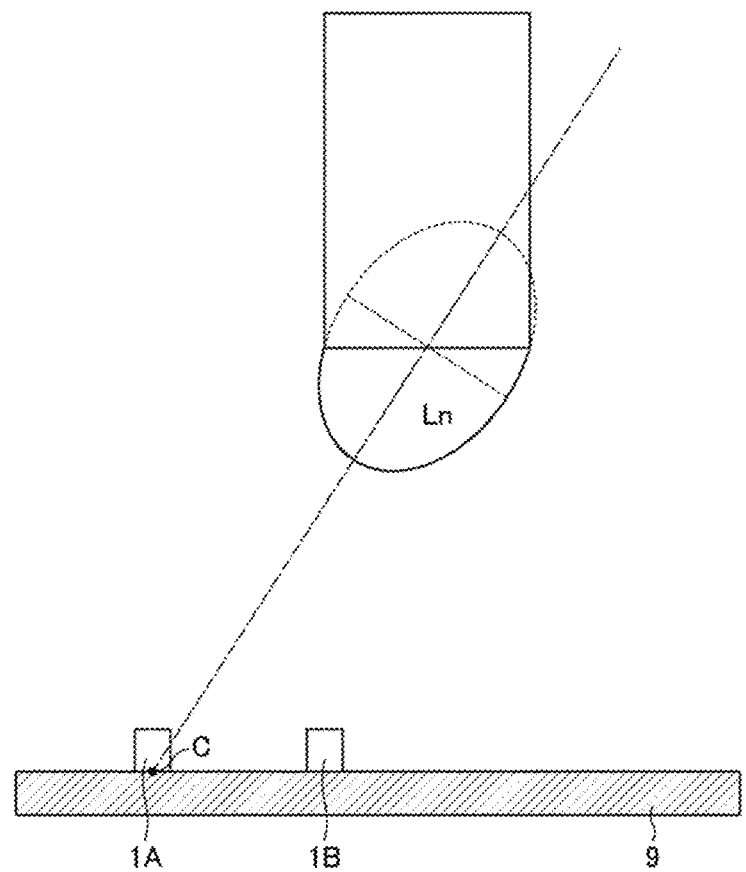
FIG. 16 is a diagram illustrating another example manner of determining a shape of an elliptical aspheric lenses, such as is shown in FIG. 14.

FIG. 16 is a diagram describing another example manner of determining the shape of an elliptical aspheric lens shown in FIG. 14.

As shown in FIG. 16, the elliptical aspheric microlens Ln in the lens array 3b' may include a curved surface line-symmetric about a center axis that is a straight line connecting a predetermined position on the elliptical aspheric microlens Ln and a light source reference position C. The light source reference position C is at the center of the light source 1A farther from the microlens Ln than the light source 1B on the surface (upper surface) of the substrate 9 receiving the light sources 1A and 1B, or in other words, on the light source placement surface.

FIG. 17 is a table showing the reduction levels of image crosstalk for aspheric lenses with different shapes.

As shown in FIG. 17, sample 1 is an aspheric microlens Ln expanded at a position nearer a light source with a positive shift from the spherical surface (indicated by a dotted line in the figure) and spherical at a position farther from the light source. Sample 2 is an aspheric microlens Ln recessed at a position nearer a light source with a negative shift from the spherical surface (indicated by a dotted line in the figure) and spherical at a position farther from the light source. Sample 3 is a spherical lens in a reference example. Sample 4 is an aspheric microlens Ln spherical at a position nearer a light source and expanded at a position farther from the light source with a positive shift from the spherical surface (indicated by a dotted line in the figure). Sample 5 is an aspheric microlens Ln spherical at a position nearer a light source and recessed at a position farther from the light source with a negative shift from the spherical surface (indicated by a dotted line in the figure).

Samples 1 and 5 show more image crosstalk, rather than less image crosstalk. Samples 2 and 4 show less image crosstalk.

Figure 18:
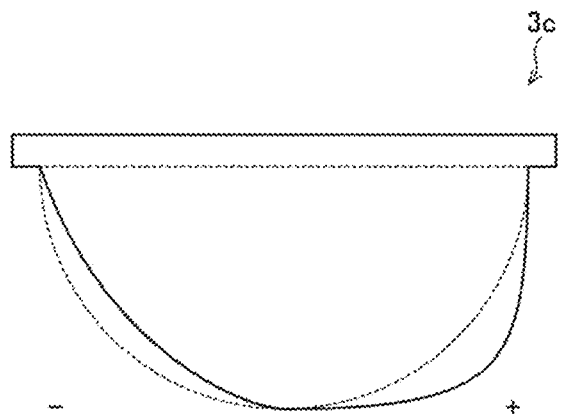
FIG. 18 is a schematic diagram illustrating a lens array including another aspheric lens for a display switching device according to a second embodiment or embodiments.

FIG. 18 is a schematic diagram of a lens array 3c including another aspheric lens for the display switching device according to the second embodiment or embodiments.

The aspheric lens shown in FIG. 18 included in the lens array 3c is recessed at a position nearer a light source with a negative shift from the spherical surface (indicated by a dotted line in the figure) and expanded at a position farther from the light source with a positive shift from the spherical surface (indicated by a dotted line in the figure). The lens array 3c including an aspheric lens with the above shape may further reduce image crosstalk, as expected from the results in FIG. 17.

The lens array including aspheric lenses may include a portion having greater averages of shifts of aspheric lenses from the spherical shape at greater distances from a predetermined lens reference position on the surface of the lens array including the microlenses.

Figure 19:
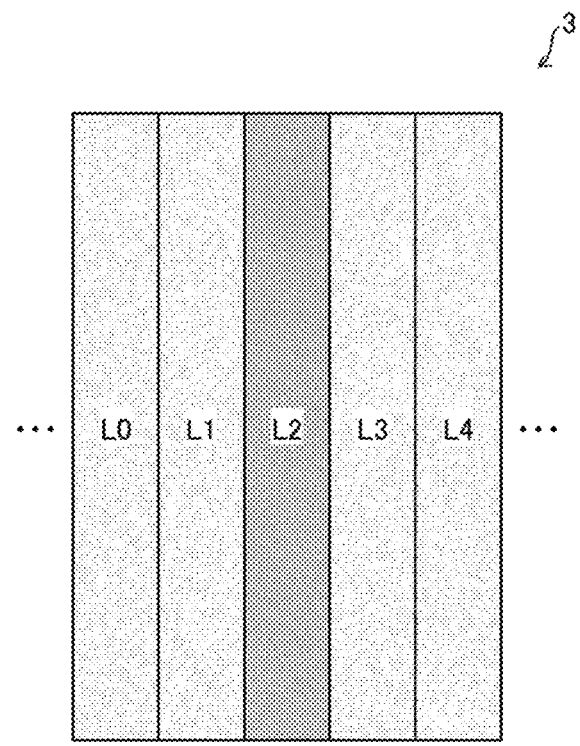
FIG. 19 is a diagram illustrating a plan view of an example lens array for a display switching device according to a first or second embodiment or embodiments.

FIG. 19 is a plan view of a lens array for the display switching device according to the first or second embodiment or embodiments.

As shown in FIG. 19, the lens array 3 may include, as the microlenses L0 to L4, cylindrical lenses arranged one-dimensionally (1D).

Figure 20:
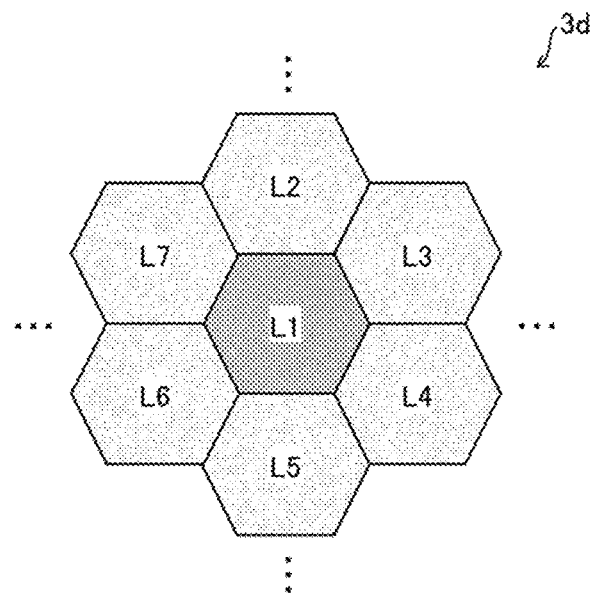
FIG. 20 is a diagram illustrating a plan view of another example lens array for a display switching device according to a first or second embodiment or embodiments.

FIG. 20 is a plan view of another example lens array for the display switching device according to the first or second embodiment or embodiments.

As shown in FIG. 20, a lens array 3d may include microlenses L1 to L7 arranged in a two-dimensional (2D) honeycomb.

Figure 21:
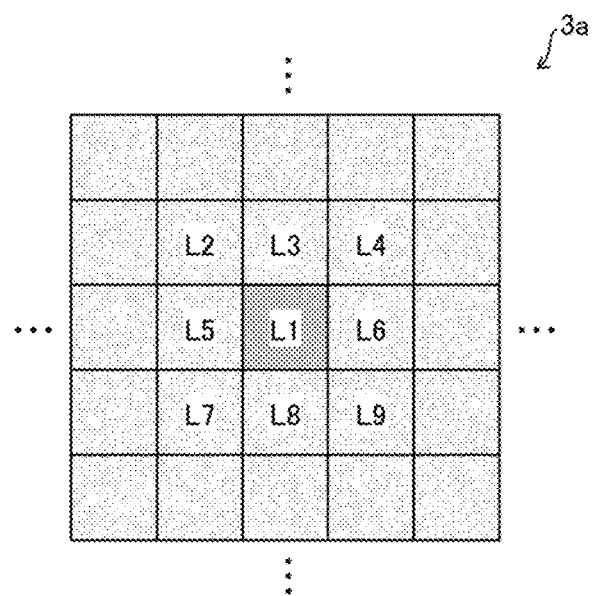
FIG. 21 is a diagram illustrating a plan view of still another example lens array for a display switching device according to a first or second embodiment or embodiments.

FIG. 21 is a plan view of still another example lens array for the display switching device according to the first or second embodiment or embodiments.

As shown in FIG. 21, a lens array 3a may include microlenses L1 to L9 arranged in a 2D matrix.

Figure 22:
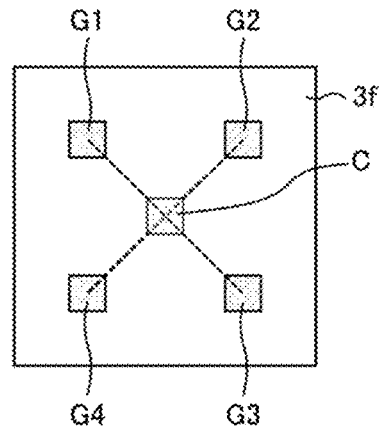
FIG. 22 is a diagram illustrating an example manner of determining a light source reference position for a lens array included in a display switching device according to the first or second embodiment or embodiments.

FIG. 22 is a diagram describing an example manner of determining a light source reference position C for a lens array 3f included in the display switching device according to the first or second embodiment or embodiments.

As shown in FIG. 22, the light source reference position C may be at the center of gravity of multiple light sources G1 to G4. A lens reference position may be the intersection between the lens array surface and a perpendicular line from the center of gravity of the light sources G1 to G4 (light source reference position C) to the lens array surface. As shown in FIG. 16, the light source reference position C for a microlens Ln may be the position of the light source farthest from the microlens Ln.

Figure 23:
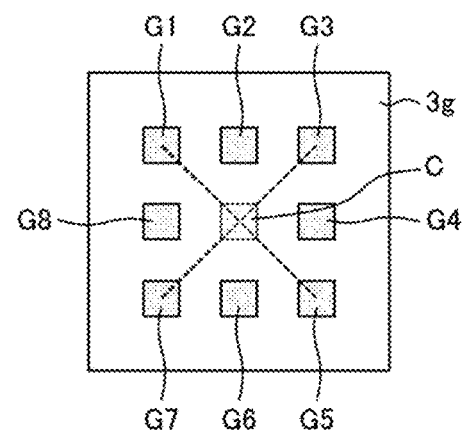
FIG. 23 is a diagram illustrating another example manner of determining a light source reference position for a lens array included in a display switching device according to a first or second embodiment or embodiments.

FIG. 23 is a diagram describing another example manner of determining a light source reference position C for a lens array 3g included in the display switching device according to the first or second embodiment or embodiments.

As shown in FIG. 23, the light source reference position C may be at the center of gravity of multiple light sources G1 to G8. A lens reference position may be the intersection between the lens array surface and a perpendicular line from the center of gravity of the light sources G1 to G8 (light source reference position C) to the lens array surface. As shown in FIG. 16, the light source reference position C for a microlens Ln may be the position of the light source farthest from the microlens Ln.

Figure 24:
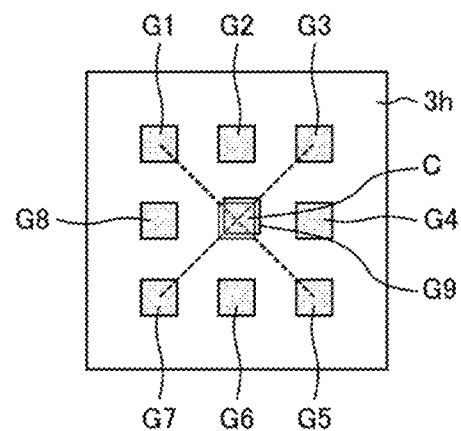
FIG. 24 is a diagram illustrating still another example manner of determining a light source reference position for a lens array included in the display switching device according to a first or second embodiment or embodiments.

FIG. 24 is a diagram describing still another example manner of determining a light source reference position C for a lens array 3h included in the display switching device according to the first or second embodiment or embodiments.

As shown in FIG. 24, the light source reference position C may be at the center of gravity of multiple light sources G1 to G9. A lens reference position may be the intersection between the lens array surface and a perpendicular line from the center of gravity of the light sources G1 to G9 (light source reference position C) to the lens array surface. As shown in FIG. 16, the light source reference position C for a microlens Ln may be the position of the light source farthest from the microlens Ln.

Figure 25:
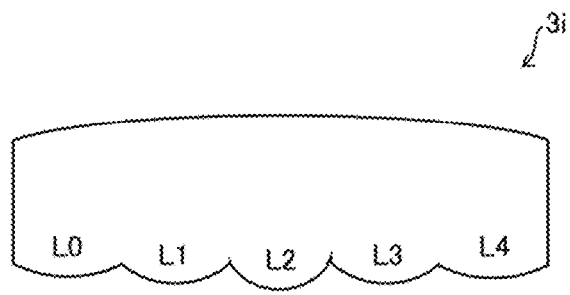
FIG. 25 is a diagram illustrating a cross-sectional view of a lens array in a first modification for a display switching device according to a first or second embodiment or embodiments.

FIG. 25 is a cross-sectional view of a lens array in a first modification for the display switching device according to the first or second embodiment or embodiments.

A lens array 3i shown in FIG. 25 includes a portion having less microlens thicknesses at greater distances from a predetermined lens reference position (microlens L2 in this example) on the surface of the lens array including the microlenses L0 to L4.

Figure 26:
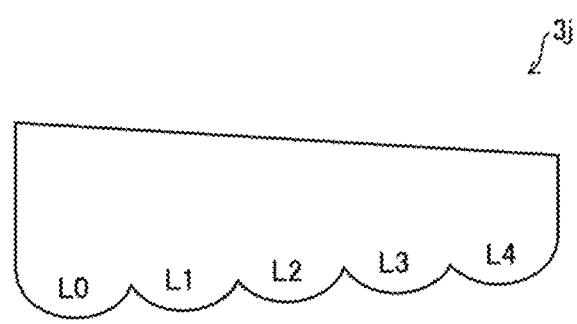
FIG. 26 is a diagram illustrating a cross-sectional view of a lens array in a second modification for a display switching device according to a first or second embodiment or embodiments.

FIG. 26 is a cross-sectional view of a lens array in a second modification for the display switching device according to the first or second embodiment or embodiments.

A lens array 3j shown in FIG. 26 includes a portion having less microlens thicknesses at greater distances from a predetermined lens reference position (the microlens L0 in this example) on the surface of the lens array including the microlenses L0 to L4.

Figure 27:
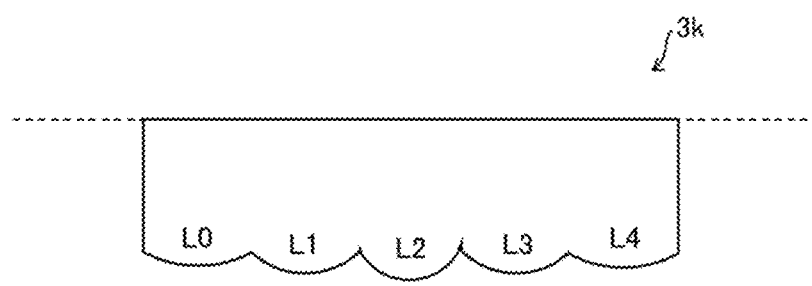
FIG. 27 is a diagram illustrating a cross-sectional view of a lens array in a third modification for a display switching device according to a first or second embodiment or embodiments.

FIG. 27 is a cross-sectional view of a lens array in a third modification for the display switching device according to the first or second embodiment or embodiments.

A surface of a lens array 3k shown in FIG. 27 farther from multiple light sources (not shown) is flat.

Figure 28:
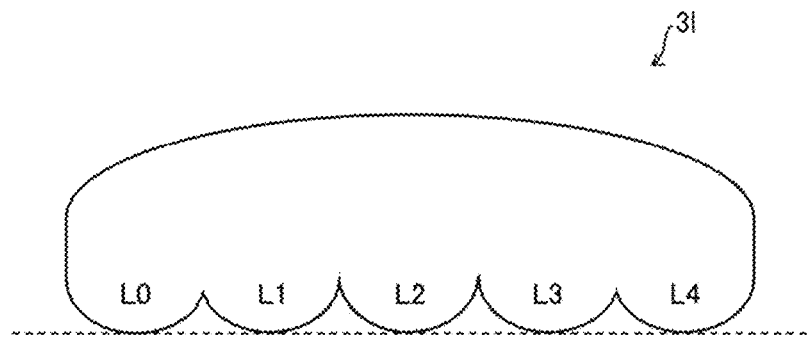
FIG. 28 is a diagram illustrating a cross-sectional view of a lens array in a fourth modification for a display switching device according to a first or second embodiment or embodiments.

FIG. 28 is a cross-sectional view of a lens array in a fourth modification for the display switching device according to the first or second embodiment or embodiments.

A lens array 3l shown in FIG. 28 includes microlenses L0 to L4 having the vertices on the same plane.

Third Embodiment

A third embodiment or embodiments will now be described with reference to FIGS. 29, 30, and 31. A display switching system 60, 60a, or 60b according to the present embodiment or embodiments includes multiple display switching devices according to any of the first and second embodiments described above. For ease of explanation, the components with the same functions as the components shown in the figures for the first and second embodiments are given the same reference numerals and will not be described.

Figure 29:
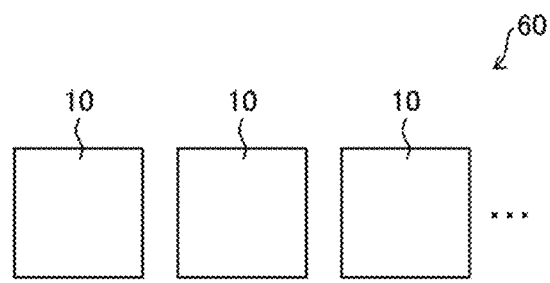
FIG. 29 is a schematic diagram illustrating a display switching system according to a third embodiment or embodiments.

FIG. 29 is a schematic diagram of the display switching system 60 according to the third embodiment or embodiments.

The display switching system 60 shown in FIG. 29 includes multiple display switching devices 10 joined laterally or vertically to have the display units in the display switching devices 10 adjacent to each other.

Figure 30:
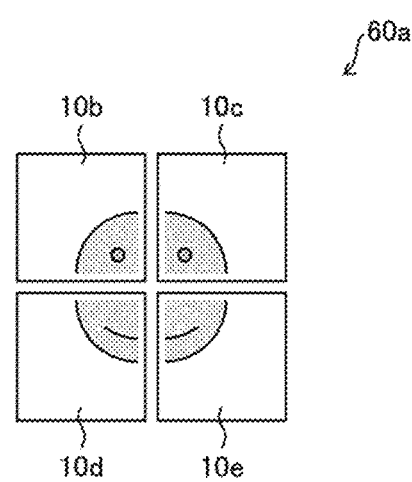
FIG. 30 is a schematic diagram illustrating a display switching system according to a modification of a third embodiment or embodiments.

FIG. 30 is a schematic diagram of a display switching system according to a modification of the third embodiment or embodiments.

The display switching system 60a shown in FIG. 30 includes multiple display switching devices 10b, 10c, 10d, and 10e joined two-dimensionally to have the display units in the display switching devices adjacent to each other.

Figure 31:
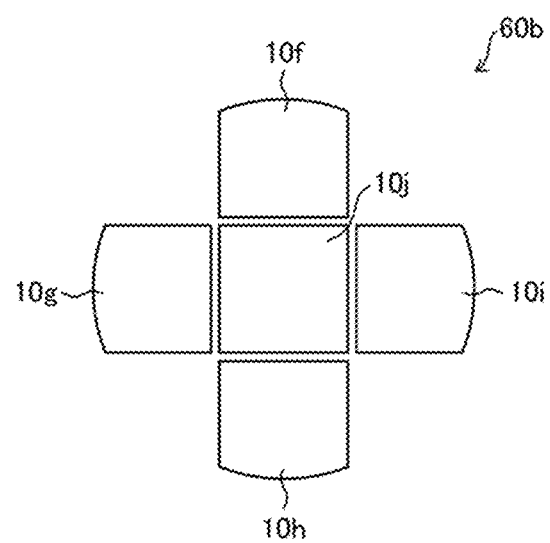
FIG. 31 is a schematic diagram illustrating a display switching system according to another modification of a third embodiment or embodiments.

FIG. 31 is a schematic diagram of a display switching system according to another modification of the third embodiment or embodiments.

The display switching system 60b shown in FIG. 31 includes multiple display switching devices 10f, 10g, 10h, 10i, and 10j joined in any arrangement to have the display units in the display switching devices adjacent to each other.

The display switching system 60, 60a, or 60b with the corresponding structure allows display of larger images or images with any shapes.

Fourth Embodiment

A fourth embodiment will now be described with reference to FIG. 32. In the present embodiment or embodiments, a switch 70 including the display switching device 10 will be described. For ease of explanation, the components with the same functions as the components shown in the figures for the first to third embodiments are given the same reference numerals and will not be described.

Figure 32:
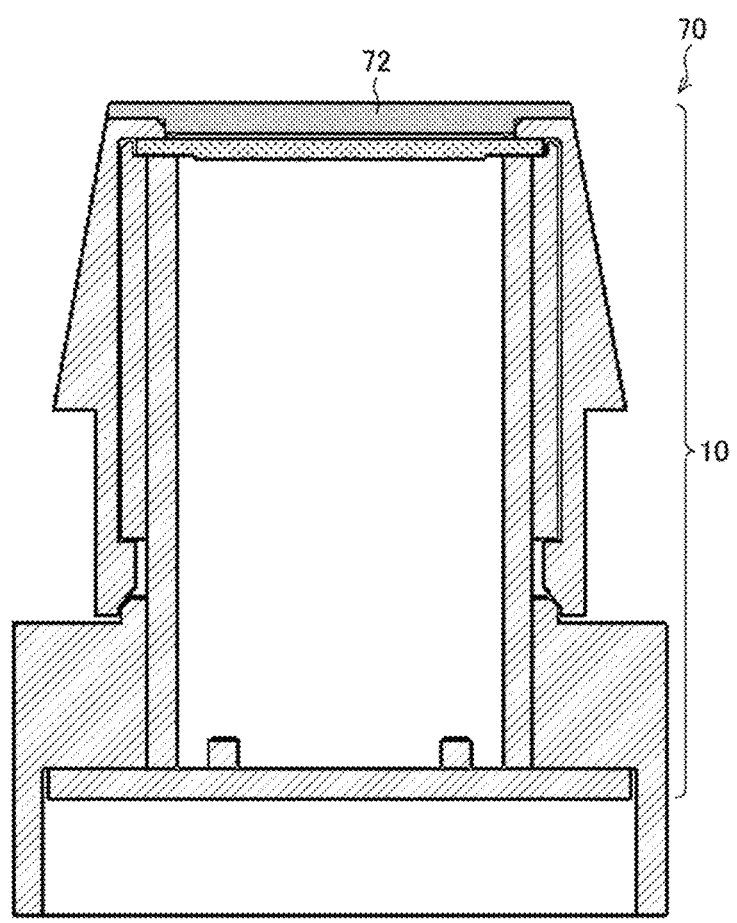
FIG. 32 is a schematic diagram illustrating a switch according to a fourth embodiment including a display switching device.
Figure 33:
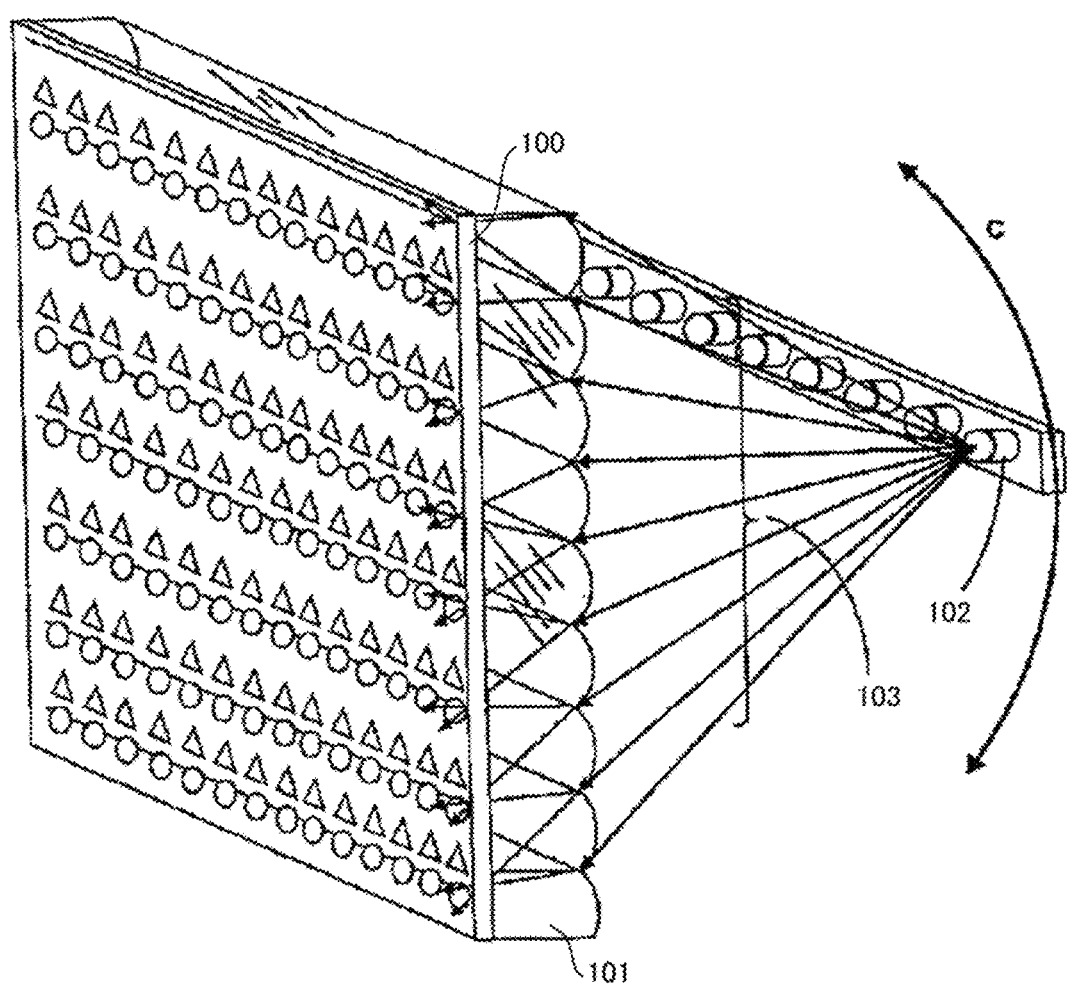
FIG. 33 is a schematic diagram illustrating a related display switching device described in Patent Literature 1.
Figure 34:
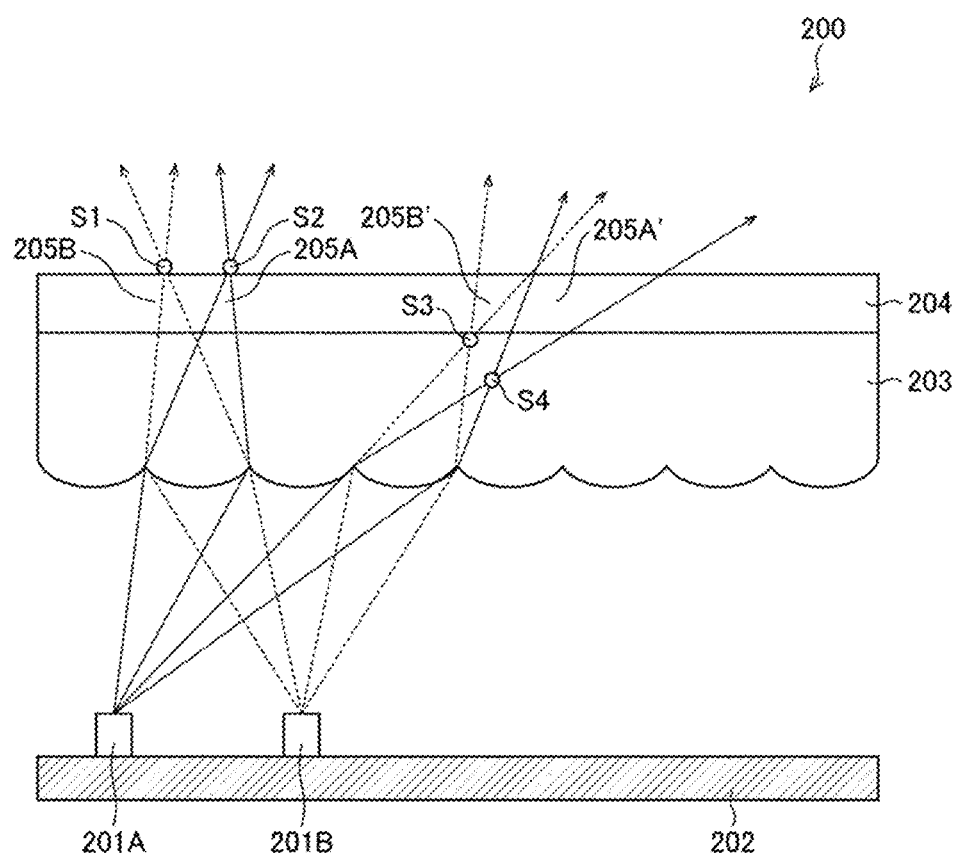
FIG. 34 is a schematic diagram illustrating a related display switching device 200.

FIG. 32 is a schematic diagram of the switch 70 according to the fourth embodiment or embodiments including the display switching device 10.

As shown in FIG. 32, the switch 70 may further include a light absorber 72 that absorbs external light. The light absorber 72 overlaps the portion of the display unit 4 other than the pixel regions in the display switching device 10 in a plan view.

Although not shown, a display switching device or a display switching system that includes static patterns representing ON and OFF may have the function of detecting a user operation on the display switching device or the display switching system to be used as a switch.

The switch with the structure has less image quality degradation resulting from image crosstalk.

An electrical apparatus including the switch described above is operated with the switch.

The electrical apparatus with the structure has less image quality degradation resulting from crosstalk on the surface of each switch or button or on a display screen included in the electrical apparatus. Examples of the electrical apparatus include, but are not limited to, game machines, in-vehicle devices, household electrical equipment, and elevators.

The embodiments described herein should not be construed to be restrictive, but may be modified within the spirit and scope of the claimed disclosure. The technical features disclosed in different embodiments may be combined in other embodiments within the technical scope.

The invention claimed is:

1. A display switching device for switching display images by switching light illumination from a plurality of light sources, the device comprising:
a lens array comprising a plurality of lenses; and
a display unit comprising a plurality of pixel regions, the plurality of pixel regions being configured to allow passage of light emitted from the plurality of light sources and focused by the plurality of lenses comprised in the lens array, wherein
each of the plurality of pixel regions has a transmittance corresponding to a predetermined static pattern,
the plurality of lenses comprise a spherical lens, and
the lens array comprises a portion having a greater average of curvature radii of lenses of the plurality of lenses at a greater distance from a predetermined lens reference position on a surface of the lens array comprising the plurality of lenses.

2. The display switching device according to claim 1, wherein
a light source reference position is at a predetermined position on a light source placement surface receiving the plurality of light sources, and
each of the curvature radii is a value greater than or equal to R satisfying a formula of $\cos \theta/L + n \cos \theta/(T-R(1-\cos \theta)) = (n-1)/R$,
where $\theta$ is an angle between a straight line connecting the light source reference position and a center of a sphere defined by a spherical surface of a corresponding lens of the plurality of lenses and a direction perpendicular to the light source placement surface,
L is a distance from the light source reference position to the lens array,
n is a refractive index of a material comprised in the lens array, and
T is a thickness of the lens array.

3. The display switching device according to claim 2, wherein
the light source reference position is at a center of gravity of the plurality of light sources.

4. The display switching device according to claim 2, wherein
the light source reference position for each of the plurality of lenses is at a light source of the plurality of light sources farthest from the lens.

5. The display switching device according to claim 1, wherein
the lens reference position is at a center of gravity of the lens array.

6. The display switching device according to claim 1, wherein
the lens reference position comprises an intersection between the surface of the lens array and a perpendicular line from a center of gravity of the plurality of light sources to the surface of the lens array.

7. The display switching device according to claim 1, wherein
the lens array has a constant thickness.

8. A display switching system, comprising:
a plurality of the display switching devices according to claim 1,
wherein the plurality of display switching devices comprise the display units adjacent to each other.

9. A switch, comprising:
the display switching device according to claim 1,
wherein the switch detects a user operation on the display switching device.

10. An electrical apparatus, comprising:
the switch according to claim 9,
wherein the electrical apparatus is operable with the switch.

11. A display switching device for switching display images by switching light illumination from a plurality of light sources, the device comprising:
a lens array comprising a plurality of lenses; and
a display unit comprising a plurality of pixel regions, the plurality of pixel regions being configured to allow passage of light emitted from the plurality of light sources and focused by the plurality of lenses comprised in the lens array, wherein
each of the plurality of pixel regions has a transmittance corresponding to a predetermined static pattern, and
the plurality of lenses comprise at least one aspheric lens.

12. The display switching device according to claim 11, wherein
the lens array comprises a portion having a greater average of focal lengths of the at least one aspheric lens at a greater distance from a predetermined lens reference position on a surface of the lens array comprising the plurality of lenses.

13. The display switching device according to claim 12, wherein
the lens array comprises a portion having a greater average of shifts of the at least one aspheric lens from a spherical shape at a greater distance from a predetermined lens reference position on a surface of the lens array comprising the plurality of lenses.

14. The display switching device according to claim 12, wherein
a light source reference position is at a predetermined position on a light source placement surface receiving the plurality of light sources, and
the at least one aspheric lens has a curved surface being line-symmetric about a central axis being a straight line connecting the light source reference position and a predetermined position on the at least one aspheric lens.

15. The display switching device according to claim 11, wherein
the lens array comprises a portion having a greater average of shifts of the at least one aspheric lens from a spherical shape at a greater distance from a predetermined lens reference position on a surface of the lens array comprising the plurality of lenses.

16. The display switching device according to claim 11, wherein
a light source reference position is at a predetermined position on a light source placement surface receiving the plurality of light sources, and
the at least one aspheric lens has a curved surface being line-symmetric about a central axis being a straight line connecting the light source reference position and a predetermined position on the at least one aspheric lens.

17. The display switching device according to claim 16, wherein
the curved surface being line-symmetric comprises a surface of a spheroid.

18. A display switching device for switching display images by switching light illumination from a plurality of light sources, the device comprising:
a lens array comprising a plurality of lenses; and
a display unit comprising a plurality of pixel regions, the plurality of pixel regions being configured to allow passage of light emitted from the plurality of light sources and focused by the plurality of lenses comprised in the lens array, wherein
each of the plurality of pixel regions has a transmittance corresponding to a predetermined static pattern, and
the lens array comprises a portion having a less lens thickness at a greater distance from a predetermined lens reference position on a surface of the lens array comprising the plurality of lenses.

19. The display switching device according to claim 18, wherein
a surface of the lens array farther from the plurality of light sources is flat.

20. The display switching device according to claim 18, wherein
the plurality of lenses have vertices on a same plane.

\* \* \* \* \*